(12) United States Patent
Sugawara

(10) Patent No.: US 7,818,162 B2
(45) Date of Patent: Oct. 19, 2010

(54) INFORMATION PROCESSING DEVICE, INFORMATION PROCESSING METHOD, SEMICONDUCTOR DEVICE, AND COMPUTER PROGRAM FOR EXECUTING INSTRUCTIONS BY USING A PLURALITY OF PROCESSORS

(75) Inventor: Akihiko Sugawara, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 803 days.

(21) Appl. No.: 11/305,114

(22) Filed: Dec. 19, 2005

(65) Prior Publication Data

US 2006/0161420 A1     Jul. 20, 2006

(30) Foreign Application Priority Data

Dec. 21, 2004    (JP) .............................. 2004-369637

(51) Int. Cl.
*G06F 9/455* (2006.01)
(52) U.S. Cl. .......................................... 703/26; 703/23
(58) Field of Classification Search .................. 703/26, 703/23
See application file for complete search history.

(56) References Cited

U.S. PATENT DOCUMENTS

| 4,638,427 | A | * | 1/1987 | Martin ......................... 703/23 |
|---|---|---|---|---|
| 5,077,657 | A | | 12/1991 | Cooper et al. .................. 703/26 |
| 6,018,797 | A | * | 1/2000 | Schmidt et al. ................ 712/42 |
| 6,247,113 | B1 | | 6/2001 | Jaggar ......................... 712/200 |
| 6,480,952 | B2 | * | 11/2002 | Gorishek et al. ............. 712/227 |
| 6,882,968 | B1 | * | 4/2005 | Linden ......................... 703/26 |
| 7,200,723 | B1 | * | 4/2007 | Ansari et al. ................. 711/154 |
| 7,222,064 | B1 | * | 5/2007 | Sollom et al. .................. 703/26 |

OTHER PUBLICATIONS

European Search Report Dated Apr. 18, 2006.

* cited by examiner

*Primary Examiner*—Paul L Rodriguez
*Assistant Examiner*—Eunhee Kim
(74) *Attorney, Agent, or Firm*—Matthew B. Dernier, Esq.; Gibson & Dernier LLP

(57) ABSTRACT

An information processing device is provided for realizing the interpreter method emulation by using a processor having a performance requested for the compile method emulation. In one embodiment, an information processing device includes a host processor 1 for executing predetermined processing and a coprocessor 2 for executing emulation in accordance with a direction from the host processor 1. The coprocessor 2 determines whether the processing to be executed in accordance with emulation is executable by the coprocessor 2 when execution of emulation is directed from the host processor 1. The coprocessor 2 executes the processing when the processing is executable by the coprocessor 2 but leaves execution of the processing to the host processor 1 when the processing is not executable by the coprocessor 2.

18 Claims, 8 Drawing Sheets

| DECODING RESULT VALUE | VALUE | TYPE OF PROCESSING |
|---|---|---|
| 0 0 ~ 3 1 | 0 | BASIC ARITHMETIC OPERATIONS (ADDTION, SUBTRACTION, ETC.) |
| 3 2 ~ 6 3 | 0 | LOGICAL OPERATIONS (LOGIC OPERATION, SHIFT OPERATION, ETC.) |
| 6 4 ~ 6 7 | 3 | COMPLEX OPERATIONS (MULTIPLICATION, DIVISION, ETC.) |
| 6 8 ~ 7 7 | 1 | LOAD/STORE |
| 7 8 ~ 9 1 | 2 | BRANCH (JUMP, CONDITIONAL BRANCH, LINK ATTACHMENT, ETC.) |
| 9 2 ~ 9 8 | 3 | OTHER PROCESSINGS |
| 9 9 | 3 | UNDEFINED PROCESSING |

FIG. 5

| DECODING RESULT VALUE | NECESSARY TIME | TYPE OF PROCESSING |
|---|---|---|
| 0 0 ~ 3 1 | 1 | BASIC ARITHMETIC OPERATIONS (ADDTION, SUBTRACTION, ETC.) |
| 3 2 ~ 6 3 | 1 | LOGICAL OPERATIONS (LOGIC OPERATION, SHIFT OPERATION, ETC.) |
| 6 4 ~ 6 5 | 1 0 | COMPLEX OPERATION (MULTIPLICATION) |
| 6 6 ~ 6 7 | 2 0 | COMPLEX OPERATION (DIVISION) |
| 6 8 ~ 7 3 | 4 | LOAD |
| 7 4 ~ 7 7 | 2 | STORE |
| 7 8 ~ 8 7 | 1 | BRANCH (JUMP, CONDITIONAL BRANCH, LINK ATTACHMENT, ETC.), WHEN BRANCH IS PERFORMED |
| 8 8 ~ 9 1 | 2 | BRANCH (JUMP, CONDITION BRANCH, LINK ATTACHMENT, ETC.), WHEN BRANCH IS NOT PERFORMED |
| 9 2 ~ 9 8 | 8 | OTHER PROCESSINGS |
| 9 9 | 8 | UNDEFINED PROCESSING |

FIG. 6

INFORMATION PROCESSING DEVICE, INFORMATION PROCESSING METHOD, SEMICONDUCTOR DEVICE, AND COMPUTER PROGRAM FOR EXECUTING INSTRUCTIONS BY USING A PLURALITY OF PROCESSORS

CROSS REFERENCE TO RELATED APPLICATION

The present application claims priority from Japanese Application No. 2004-369637 filed Dec. 21, 2004, the disclosure of which is hereby incorporated by reference herein.

BACKGROUND OF THE INVENTION

The present invention relates to an information processing device, and in particular, relates to an information processing device for executing processing such as emulation by using a plurality of processors.

Some information processing devices such as general-purpose server systems or high-performance personal computers respectively include a multiprocessor system having a plurality of processors. In the case of an information processing device using a multiprocessor system, decentralized processing by a plurality of processors is normally performed. In the case of decentralized processing, each processor is constituted so as to operate optimally.

For example, it may be said that a coprocessor system including a host processor and a coprocessor is a multiprocessor system in a broad sense because of the use of a plurality of processors. The coprocessor is normally constituted by specifying it to specific processing and using it to enhance the performance of the host processor. Because the host processor and coprocessor are connected (coprocessor connection) to each other by an exclusive bus capable of transmitting/receiving a substantial amount of data in a short time, the coprocessor system is suitable for data processing requiring minute timing control.

Emulation may be performed by using this multiprocessor system. The basic function of an emulator for performing emulation forms the execution environment of an information processing device in which execution of application software is originally placed on another information processing device and is realized by software, hardware, or combination of the software and hardware. In the case of the processor of an information processing device for performing emulation, the functionality of the processor (hereinafter, referred to as "target processor") of an information processing device in which application software is executed at the time of emulation is formed to execute the application software. In this case, the processor serves as an emulator.

When performing emulation using a multiprocessor system, a processor dedicated to emulation may be set in an information processing device as an emulator. In this case, however, it is necessary to develop a processor dedicated to emulation. This is not very realistic because of increased cost and increased development periods. Emulation is also necessary for peripheral equipment to be connected to an information processing device and it is difficult to know what capacity of a processor is necessary at the development stage.

An emulation system is generally divided into a compile method and an interpreter method depending on whether the system executes a plurality of processings of an instruction constituting application software (hereinafter, referred to as "target processor instruction") or successively executes the processings one by one.

The compile method converts an instruction block constituted of a plurality of instructions as one unit and executes processing of every instruction block. Therefore, the compile method may realize high performance for processing that is frequently repeated. However, in the case of the compile method, the memory capacity required by an emulator increases and the response to self-modifying code is difficult. Moreover, because the fluctuation of performance is largely dependent on the frequency of repetitive execution, there is a problem that timing control is difficult.

Because the interpreter method performs conversion of every instruction, response to self-modifying code is better compared to the case of the compile method, the fluctuation of performance is small, and timing control is easy. Therefore, the interpreter method is suitable for emulation of a processor for a real-time system and high compatibility may be expected. Moreover, the memory capacity required by an emulator is small compared to the case of the compile method. However, the interpreter method has a problem that performance, such as processing speed, is experimentally inferior by ½ to ⅓ compared to the case of the compile method.

To solve the problem of the interpreter method, it is necessary to increase the speed by two or three times compared to the case of using a processor for performing emulation by the compile method. In fact, however, a problem frequently occurs that a processor of such high speed is not present, the cost increases even if the processor is present, or power consumption is large.

Moreover, when a processor for a real-time system is realized by emulation, it is impossible to guarantee a high compatibility unless a logically correct result is obtained or the timing for processing is adjusted.

SUMMARY OF THE INVENTION

It is an object of the present invention to provide an information processing device, which processes together by a plurality of processors, such as an information processing device, which performs emulation together as a plurality of processors.

The present invention is made to solve the above problem and to provide an information processing device for realizing the interpreter method emulation of a requested performance by using a processor having a performance suitable for the compile method emulation.

An information processing device of the present invention for solving the above problem includes a first processor for obtaining a predetermined instruction and a second processor for executing predetermined processing in accordance with a direction from the first processor. The first processor is constituted so as to direct the second processor to execute the predetermined processing in accordance with the predetermined instruction. The second processor includes a determination means for determining whether the predetermined processing directed from the first processor may be executed, and when the predetermined processing may not be executed, sending a notice that the predetermined processing may not be executed to the first processor, and a second means for executing the predetermined processing when the predetermined processing may be executed. The first processor is constituted so as to execute the predetermined processing when the notice is sent from the second processor. The information processing device is constituted so that the first processor and the second processor execute the processing according to the predetermined instruction together.

In the case of the information processing device of the present invention, the first processor and second processor perform processing (for example "emulation") together. Therefore, even if the first processor has only a performance suitable for the compile method emulation, the information processing device may nevertheless perform the interpreter method emulation.

An information processing method of the present invention is executed by an information processing device including a first processor for obtaining a predetermined instruction and a second processor for executing predetermined processing in accordance with a direction from the first processor, the first processor and the second processor execute the processing according to the instruction together. This method includes a step for the first processor to direct the second processor to execute the predetermined processing in accordance with the predetermined instruction, a step for the second processor to determine whether the predetermined processing directed from the first processor may be executed by the second processor, a step for the second processor to execute the predetermined processing when the predetermine processing may be executed by the second processor, a step for the second processor to notify the first processor that the predetermined processing may not be executed by the second processor when the predetermined processing may not be executed by the second processor, and a step for the first processor to execute the predetermined processing when receiving the notice that representing the predetermined processing may not be executed by the second processor from the second processor.

A semiconductor device of the present invention includes a first processor for obtaining a predetermined instruction and a second processor for executing the predetermined processing in accordance with a direction from the first processor, in which the first processor is constituted so as to direct the second processor to execute the predetermined processing in accordance with the predetermined instruction, the second processor includes determination means for determining whether the predetermined processing directed from the first processor may be executed and when the predetermined processing may not be executed, and when the predetermined processing may not be executed, sending a notice that the predetermined processing may not be executed to the first processor, and a second processing means for executing the predetermined processing when it may be executed, the first processor is constituted so as to execute the predetermined processing when the notice is sent from the second processor, and the first processor and the second processor execute the processing according to the predetermined instruction together.

A computer program of the present invention is a computer program for directing a computer system to perform processing, the computer system including a first processor for obtaining a predetermined instruction and a second processor for executing predetermined processing in accordance with a direction from the first processor, the first processor and the second processor execute the processing according to the instruction together, the processing comprising, the processing for the first processor to direct the second processor to execute the predetermined processing in accordance with the predetermined instruction, the processing for the second processor to determine whether the predetermined processing directed from the first processor may be executed by the second processor, the processing for the second processor to execute the predetermined processing when the predetermined processing may be executed by the second processor, the processing for the second processor to notify the first processor that the predetermined processing may not be executed by the second processor when the predetermined processing may not be executed by the second processor, and the processing for the first processor to execute the predetermined processing when receiving the notice that representing the predetermined processing may not be executed by the second processor from the second processor.

The computer program is recorded in, for example, a computer-readable recording medium.

BRIEF DESCRIPTION OF THE DRAWINGS

FIG. 5 is an illustration of an execution instruction table;

FIG. 6 is an illustration of an execution clock table;

DETAILED DESCRIPTION OF THE PREFERRED EMBODIMENTS

An embodiment of the present invention is described below in detail.

Figure 1:
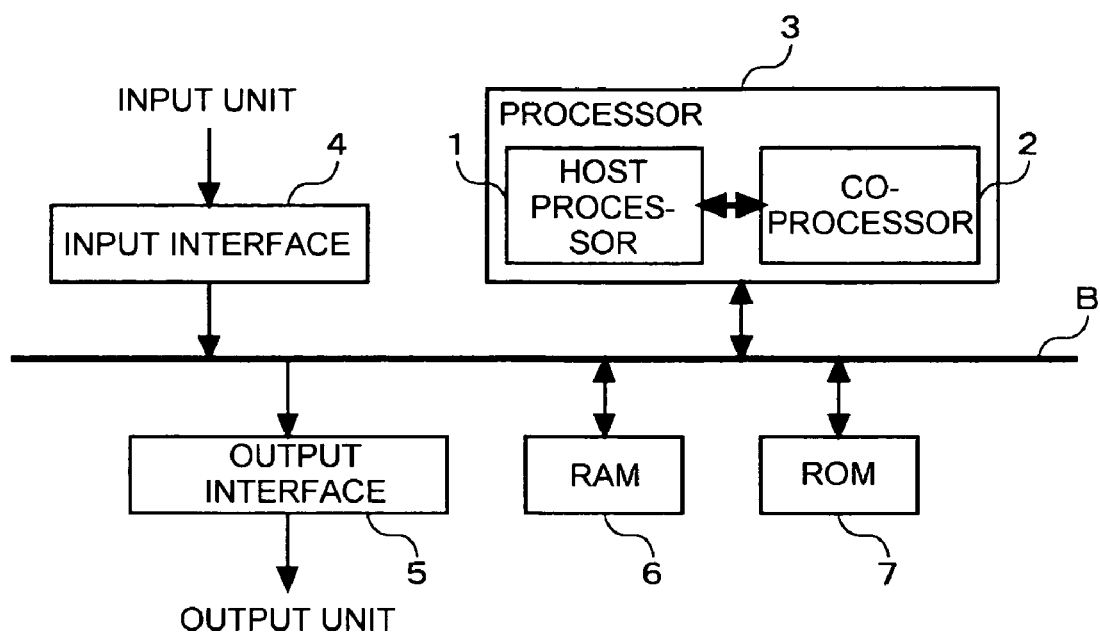
FIG. 1 is a block diagram of the information processing device of the present embodiment.

FIG. 1 is a block diagram of the information processing device of this embodiment.

The information processing device includes a processor 3 for controlling operations of other components in the information processing device including a host processor 1 and a coprocessor 2, an input interface 4 for controlling an interface with input units such as a keyboard and a mouse to receive input data from an input unit, an output interface 5 for controlling an interface with output units such as a display and speaker to output data such as a processing result from an output unit, a RAM (Random Access Memory) 6 for storing various types of data used for executing processing by the information processing device and instructions, and a ROM (Read Only Memory) 7 for storing a basic program such as BIOS and a program for performing emulation. Each component is connected so that data may be transmitted and received through a bus B.

A predetermined processing environment is constructed when the processor 3 reads a necessary basic program from the ROM 7 and executes the basic program. When the predetermined processing environment is realized, the processor 3 executes processing in accordance with the input data from an input unit and outputs the processing result to an output unit through the output interface 5.

An emulator is constructed by the processor 3 as a characteristic configuration of the present invention. The processor 3 constructs an emulator by host processor 1 and coprocessor 2, and executing the program for performing emulation stored in the ROM 7. The host processor 1 and coprocessor 2 in the processor 3 are coprocessor-connected so that a substantial amount of data may be transmitted and received at a speed higher than the case of normal I/O connection. It is also contemplated to connect the host processor 1 and coprocessor 2 in accordance with the normal I/O connection. In this case, it may be allowed to realize not a system using a coprocessor but a normal multiprocessor system.

When the host processor 1 obtains an instruction from the outside through the input interface 4 or the RAM 6, it executes the processing according to the instruction. Instructions include those to be executed by the host processor 1 and those to be executed by the coprocessor 2. When an instruction is executed by the host processor 1, the host processor directly executes the instruction. When an instruction is executed by the coprocessor 2, the instruction is sent from the host processor 1 to the coprocessor 2.

Instructions are input to the coprocessor 2 only from the host processor 1. Instructions are not directly input from other components excluding the host processor 1. The coprocessor 2 executes the processing according to an instruction input from the host processor 1 and returns a processing result to the host processor 1. Instructions are not input to the coprocessor 2 from other components excluding the host processor 1 even when arranged as a normal multiprocessor system.

Figure 2:
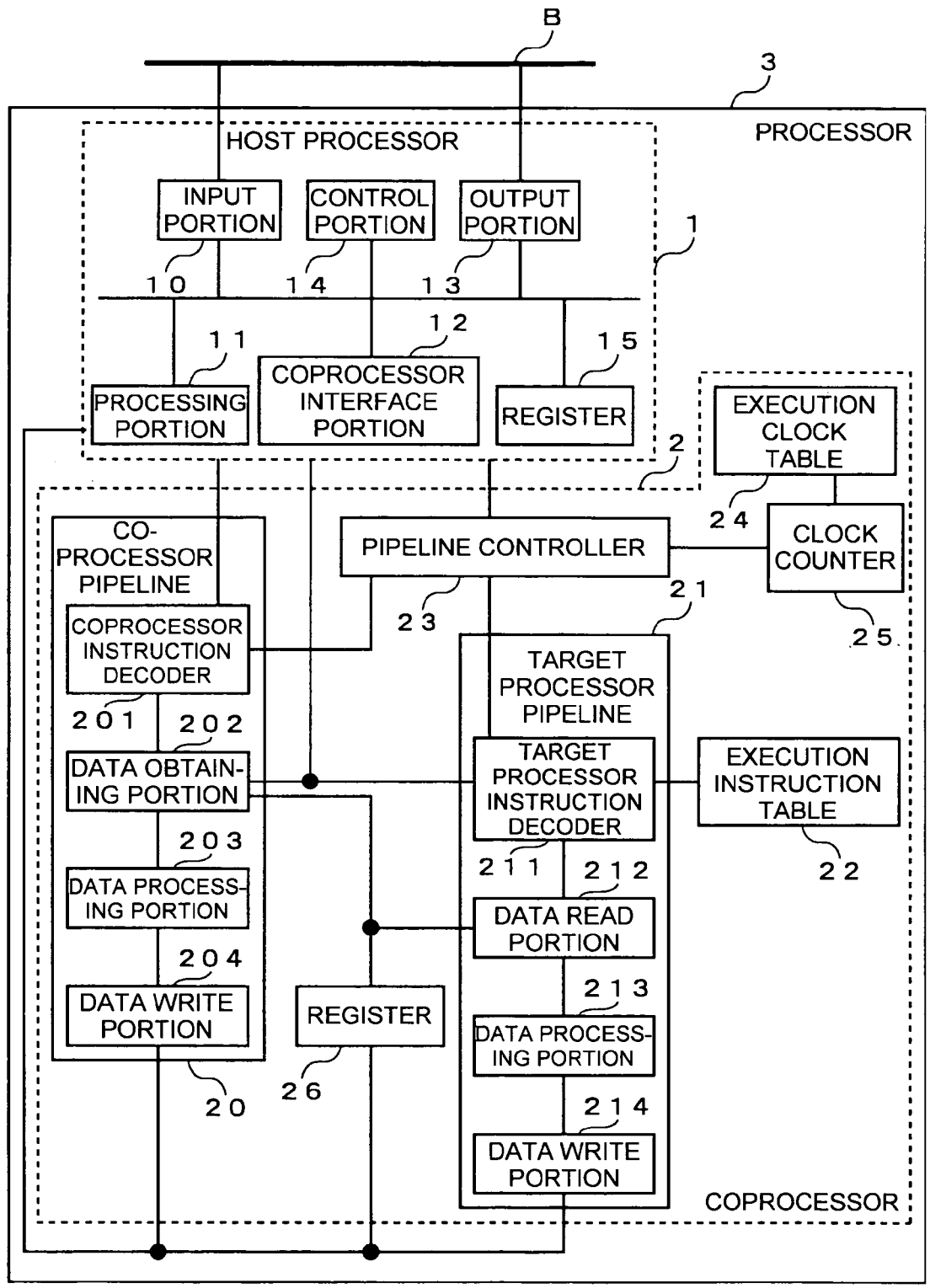
FIG. 2 is a general block diagram of an emulator according to the present embodiment.

FIG. 2 is a detailed block diagram of the processor 3 when an emulator is constructed. It is allowed to construct the emulator by executing the above program. However, it is also allowed to constitute components in the host processor 1 and coprocessor 2 by using hardware such as a semiconductor chip. For example, it is allowed to constitute the emulator by using a semiconductor chip for the host processor 1 and a semiconductor chip for the coprocessor 2 or constitute the emulator by using the host processor 1 and coprocessor 2 as one semiconductor chip. An emulator constructed by the processor 3 is described below in detail.

The processor 3 is constituted so as to perform interpreter method emulation by executing the processing according to emulation in collaboration with the host processor 1 having a throughput requested for the compile method emulation and the coprocessor 2. According to this configuration, it is possible to realize the interpreter method emulation without using a high-performance processor. The processor 3 executes a basic operational instruction having a high execution frequency by the coprocessor 2 and executes other instructions such as input/output instruction to/from other components, branch instruction, instruction having a long execution time, and complex instruction by the host processor 1.

The host processor 1 includes an input portion 10, a processing portion 11, a coprocessor interface portion 12, an output portion 13, a control portion 14, and a register 15.

The input portion 10 is connected to a bus B so as to obtain data, instructions, and programs from other components such as the RAM 6 and ROM 7 through the bus B.

The processing portion 11 executes the processing corresponding to the data, instruction, or program obtained from the input portion 10. Particularly, the processing portion 11 is constituted so as to execute the processing according to a target processor instruction when executing the processing according to emulation at the host processor 1.

The coprocessor interface portion 12 transmits and receives data and instructions to and from the coprocessor 2. The output portion 13 is connected to the bus B so as to output such as a processing result to other components through the bus B.

The control portion 14 controls operations of components in the host processor 1. The control portion 14 includes a determination portion for determining whether to execute processing in the host processor 1 or coprocessor 2 in accordance with an instruction obtained from the input portion 10 and a direction portion for making the processing portion 11 or coprocessor 2 execute processing in accordance with a determination result of the determination portion. When processing is executed in the host processor 1 as a result of determination by the determination portion, the direction portion directs execution of the processing according to the instruction. When processing is executed in the coprocessor 2, the instruction and relevant data are sent from the direction portion through the coprocessor interface portion 12. Whether the instruction is processed by the host processor 1 or coprocessor 2 is solved by making the instruction include the information representing by which the instruction is processed. Moreover, the control portion 14 may make determination in accordance with the type of an instruction.

The register 15 not only functions as a register of a conventional processor but also stores the data used when the coprocessor 2 executes processing. The data, instruction, and program obtained by the input portion 10 are stored in the register 15.

The host processor 1 having the above configuration sends an instruction used for making the coprocessor 2 execute predetermined processing (hereinafter, referred to as "coprocessor instruction") and data used when executing the processing (hereinafter, referred to as "coprocessor data") from the coprocessor interface portion 12 when making the coprocessor 2 execute the processing. The coprocessor instruction and coprocessor data are used to make the coprocessor 2 execute the interpreter method emulation in addition to normal processing to be executed by the coprocessor 2. When making the coprocessor 2 execute the emulation, the host processor 1 directs the coprocessor 2 to execute emulation in accordance with the coprocessor instruction and directs the processing to be executed through emulation in accordance with the coprocessor data. The coprocessor data when making the coprocessor 2 execute emulation is particularly referred to as a target processor instruction.

The host processor 1 measures the time actually required for the emulation by the coprocessor 2 by the control portion 14, obtains the average emulation execution time, and adjusts the timing of the emulation by the coprocessor 2.

Therefore, the host processor 1 sets a value representing the number of processings to be executed through emulation in a predetermined time by necessary time (hereinafter, referred to as "set value") to the coprocessor 2. By sending the data including the set value (hereinafter, referred to as "timing data") to the coprocessor 2 from the coprocessor interface portion 12, the set value is set to the coprocessor 2. The time until receiving a notice representing that emulation is completed after inputting the timing data is actual time required for the emulation by the coprocessor 2.

The coprocessor 2 executes the processing corresponding to a coprocessor instruction input from the host processor 1. In the case of this embodiment, the coprocessor 2 is constituted so as to execute the processing according to emulation and other processings excluding emulation. The coprocessor 2 includes a coprocessor pipeline 20, a target processor pipeline 21, an execution instruction table 22, a pipeline controller 23, an execution clock table 24, a clock counter 25, and a register 26.

The coprocessor pipeline 20 performs all other processings excluding the emulation to be executed by the coprocessor 2. The coprocessor pipeline 20 includes a coprocessor instruction decoder 201, data obtaining portion 202, data processing portion 203, and data write portion 204.

The coprocessor instruction decoder 201 decodes a coprocessor instruction sent from the host processor 1 and determines what processing the coprocessor instruction directs. A determination result is communicated to the pipeline controller 23. Particularly, when the coprocessor instruction directs emulation, emulation is performed by the target processor pipeline 21 by notifying the pipeline controller 23 that the coprocessor instruction directs emulation.

Figure 3:
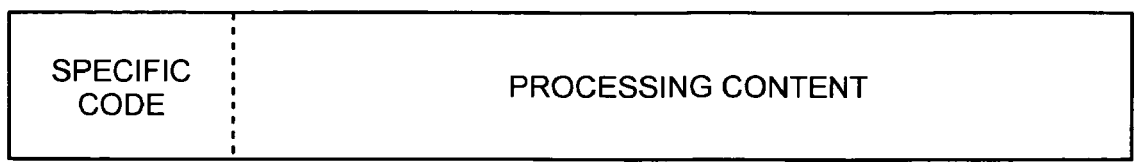
FIG. 3 is an illustration of the format of a coprocessor instruction.

FIG. 3 is an illustration showing a format of a coprocessor instruction. The coprocessor instruction includes a specific code for directing that the processing may be executed by the coprocessor 2 or emulation is performed. Thereby, a coprocessor instruction decoder 201 can determine whether a coprocessor instruction directs emulation. The coprocessor instruction moreover includes the information (processing content) representing the content of the information to be actually executed by the coprocessor pipeline 20. The processing content includes an obtaining destination of the data used for processing, output destination of a processing result, type of processing, etc.

The data obtaining portion 202 obtains the coprocessor data from the host computer 1 or obtains the data necessary for processing from the register 26 when actually executing processing other than emulation and sends the coprocessor data or the data to the data processing portion 203. An obtaining destination of the data necessary for the processing is directed by a decoded coprocessor instruction.

The data processing portion 203 executes predetermined processing by using the data obtained from the data obtaining portion 202. The processing content is directed in accordance with a coprocessor instruction decoded by the coprocessor instruction decoder 201.

The data write portion 204 writes a processing result by the data processing portion 203 in the register 26 or returns the processing result to the host processor 1. Whether to write the processing result in the register 26 or to return the processing result to the host processor 1 is previously directed by the coprocessor instruction. The data write portion 304 may write the processing result in the register 26 and returns the processing result to the host processor 1.

The target processor pipeline 21 performs emulation and realizes the same function as a target processor, when emulation is directed from the pipeline controller 23. Therefore, the target processor pipeline 21 includes a target processor instruction decoder 211, a data read portion 212, a data processing portion 213, and a data write portion 214.

The target processor instruction decoder 211 obtains the coprocessor data sent from the host processor 1 as a target processor instruction and decodes the target processor instruction, when emulation is directed from the pipeline controller 23. As a result of decoding, the target processor instruction decoder 211 obtains actual processing content and a decoding result value. The decoding result value is a value representing what the processing (type of processing) directed by a target processor instruction is. For example, the decoding result value takes "00" to "31" for the basic arithmetic operation (addition, subtraction, etc.), "32" to "63" for the logical operation (logic operation, shift operation, etc.), "64" to "67" for the complex operation (multiplication, division, etc.), "68" to "77" for the load/store, "78" to "91" for the branch (jump, conditional branch, link-provided branch, etc.), "92" to "98" for other instructions, and "99" for an undefined instruction.

The target processor instruction decoder 211 determines whether the instruction directs the processing which may be executed by the target processor pipeline 21 by comparing the decoding result value with the execution instruction table 22 and communicate the determination result to the pipeline controller 23. Moreover, the decoding result value is sent to the clock counter 25 through the pipeline controller 23 or directly.

Figure 4:
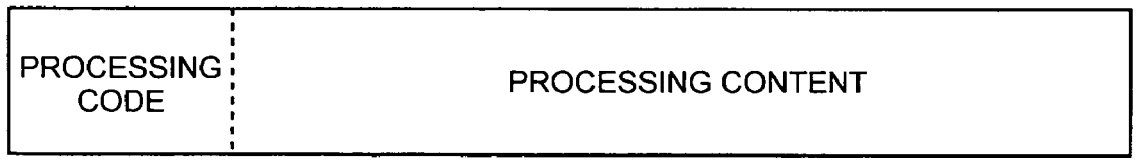
FIG. 4 is an illustration of the format of a target processor instruction.

FIG. 4 is an illustration showing a format of a target processor instruction. The target processor instruction includes a processing code representing the type of processing and its processing content. The target processor instruction decoder 211 obtains a decoding result value by decoding a processing code in coprocessor data. The processing content includes the obtaining destination of the data used for processing, output destination of a processing result, type of processing, etc.

The data read portion 212 reads the data necessary for processing from the register 26 and sends the data to the data processing portion 213. The obtaining destination of the data necessary for processing is previously directed by a target processor instruction.

The data processing portion 213 executes predetermined processing by using the data read by the data read portion 212. Processing content is directed by a target processor instruction decoded by the target processor instruction decoder 211.

The data write portion 214 writes a processing result by the data processing portion 213 in the register 26 or returns the processing result to the host processor 1. Whether to write the processing result in the register 26 or to return the processing result to the host processor 1 is directed by a target processor instruction. The data write portion 214 may write the processing result in the register 26 and return the processing result to the host processor 1.

The execution instruction table 22 is a table representing instructions, which may be executed by the target processor pipeline 21. The execution instruction table 22 is referenced by the target processor instruction decoder 211 so that it is known whether a decoding result value obtained from the target processor instruction decoder 211 represents an instruction which may be executed by the target processor pipeline 21. It is preferable that the execution instruction table 22 is provided to a rewritable memory. By providing the execution instruction table 22 to the rewritable memory, it is possible to optimize the throughput by changing types of instructions to be executed by the target processor pipeline 21 and adjusting the allocation of throughput with the host processor 1, or rewrite instruction values corresponding to the execution instruction table 22 when a design error is present in some instruction processings of the coprocessor 2.

FIG. 5 is an illustration of the execution instruction table 23. In this table, "value" represents whether a corresponding decoding result value is processing which may be executed by the target processor pipeline 21. In FIG. 5, when "value" is "0", the coprocessor 2 may execute completely the processing. When "value" is "1", the coprocessor 2 may calculate a memory address, however, the coprocessor 2 may not execute the access to the RAM 6 connected to the host processor 1 through the bus B. Therefore, instead of the coprocessor 2, the host processor 1 gains access to RAM 6. When "value" is "2", the coprocessor 2 may calculate a branch-destination address and determine whether to branch. However, the coprocessor 2 may not obtain the instruction of the branch destination. When "value" is "3", the coprocessor 2 may not execute every processing. In the case of the example in FIG. 5, the target processor pipeline 21 may completely execute the basic arithmetic operation and the logical operation, execute processings other than memory access of load/store, and execute processings other than instruction obtainment of a branch direction of branch. The host processor 1 performs a complex operation and processings according to other instructions and undefined instruction.

The pipeline controller 23 controls whether to perform processing using what component in the coprocessor 2 in accordance with a notice from the coprocessor instruction decoder 201.

The pipeline controller 23 directs the target processor instruction decoder 211 of the target processor pipeline 21 to execute emulation, when the notice representing that emulation is performed is sent from the coprocessor instruction decoder 201. Thereby, the target processor pipeline 21 functions as an emulator. The pipeline controller 23 directs the coprocessor instruction decoder 201 of the coprocessor pipeline 20 to execute the processing, when the notice representing that processing excluding emulation is performed is sent from the coprocessor instruction decoder 201.

Moreover, when the pipeline controller 23 receives the notice of a determination result representing whether processing may be executed by the target processor pipeline 21 from the target processor instruction decoder 211, the pipeline controller 23 sends status data corresponding to the notice to the host processor 1. The host processor 1 may recognize whether a target processor instruction may be executed by the coprocessor 2 in accordance with the status data.

The execution clock table 24 represents the necessary time required when the target processor executes the processing to be executed in accordance with emulation by the target processor pipeline 21 and is referenced by the clock counter 25. FIG. 6 is an illustration of the execution clock table 24. In this table, "necessary time" uses one cycle of an operational clock as a unit; such as basic arithmetic operation and logical operation respectively require one cycle.

The clock counter 25 adjusts the timing of execution of emulation.

The clock counter 25 is set a set value in accordance with the timing data from the host processor. The clock counter 25 obtains the necessary time when the target processor executes the processing corresponding to a decoding result value, referring to the execution clock table 24 with the decoding result value obtained through the pipeline controller 23. Or, the clock counter 25 obtains the necessary time from the target processor instruction decoder 211 directly. The clock counter 25 successively subtracts the necessary time obtained from the execution clock table 24 from the set value and when the predetermined necessary time becomes "0" or negative, notifies the host processor 1 that the predetermined necessary time has become "0" or negative through the pipeline controller 23.

The register 26 stores a processing result by the coprocessor pipeline 20 and a processing result of emulation by the target processor pipeline 21. The processing results stored in the register 26 become the data for a processing object of other processing to be executed by the coprocessor pipeline 20 and the target processor pipeline 21. Moreover, the register 26 is capable of directly output the processing results to the host processor 1.

Figure 7:
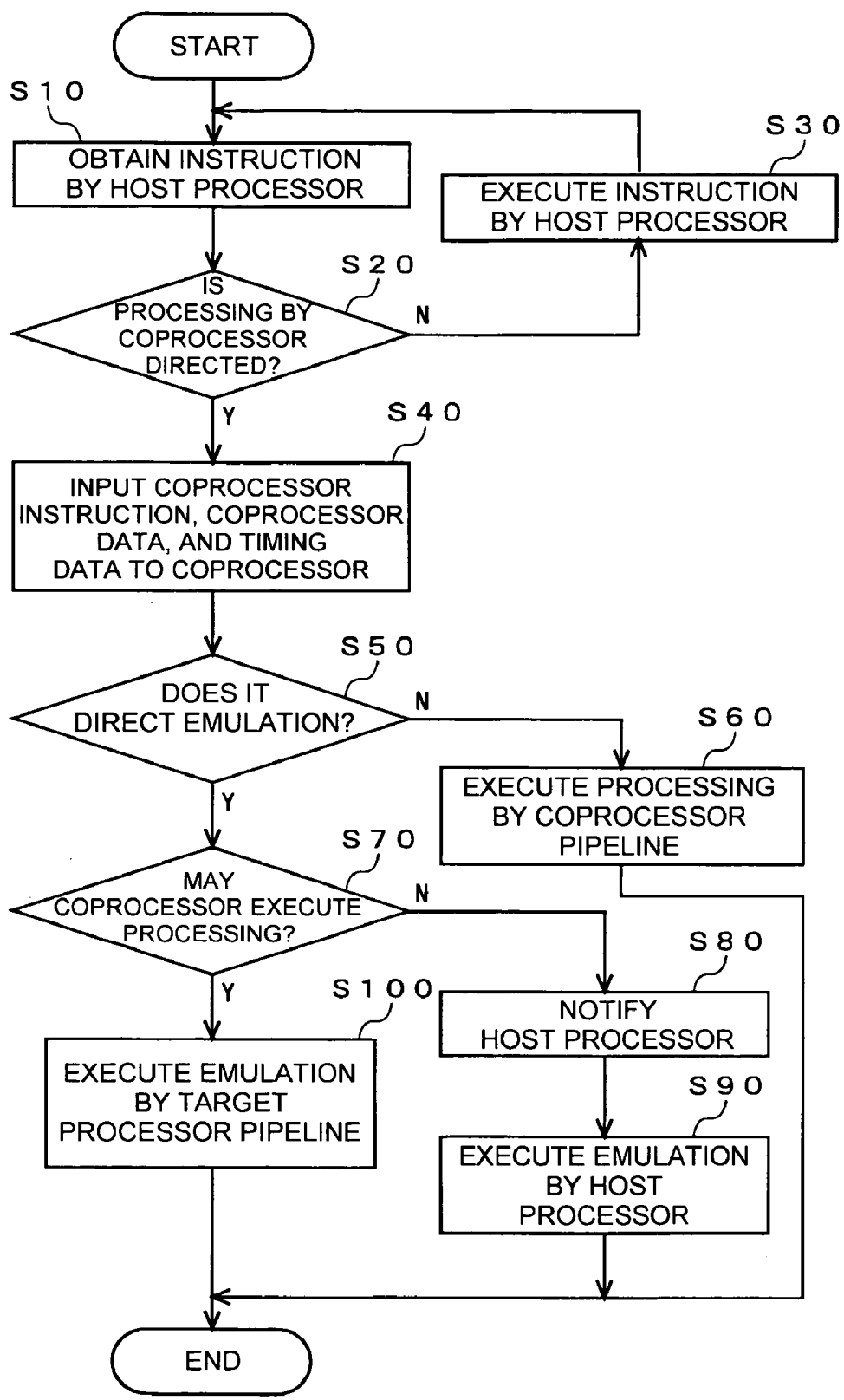
FIG. 7 is an illustration showing a flow of the processing of emulation according to the present embodiment.

The information processing device having the above configuration performs the following operations. FIG. 7 is an illustration showing a flow of processing of emulation by the processor 3.

The host processor 1 obtains an instruction from another component in the information processing device by the input portion 10 (step S10). The host processor 1 determines whether the instruction is used for the coprocessor 2 by the control portion 14 (step S20). When the instruction is not used for the coprocessor 2, the host processor 1 executes the processing according to the instruction by the processing portion 11 (step S20:N, step S30).

When the instruction is used for the coprocessor 2, the host processor 1 inputs a coprocessor instruction, coprocessor data, and timing data to the coprocessor 2 (step S20:Y, step S40). The coprocessor instruction is input to the coprocessor pipeline 20, the coprocessor data is input to the coprocessor pipeline 20 and target processor pipeline 21, and the timing data is input to the clock counter 25 through the pipeline controller 23 or directly. The timing data is not always input at the same timing as the coprocessor instruction and coprocessor data, but at a predetermined time interval.

The coprocessor instruction decoder 201 of the coprocessor pipeline 20 determines whether the coprocessor instruction input from the host processor 1 directs execution of emulation (step S50). Because the coprocessor instruction has the format shown in FIG. 3, the coprocessor instruction decoder 201 confirms whether execution of emulation is directed by confirming the specific code of the coprocessor instruction.

Figure 8:
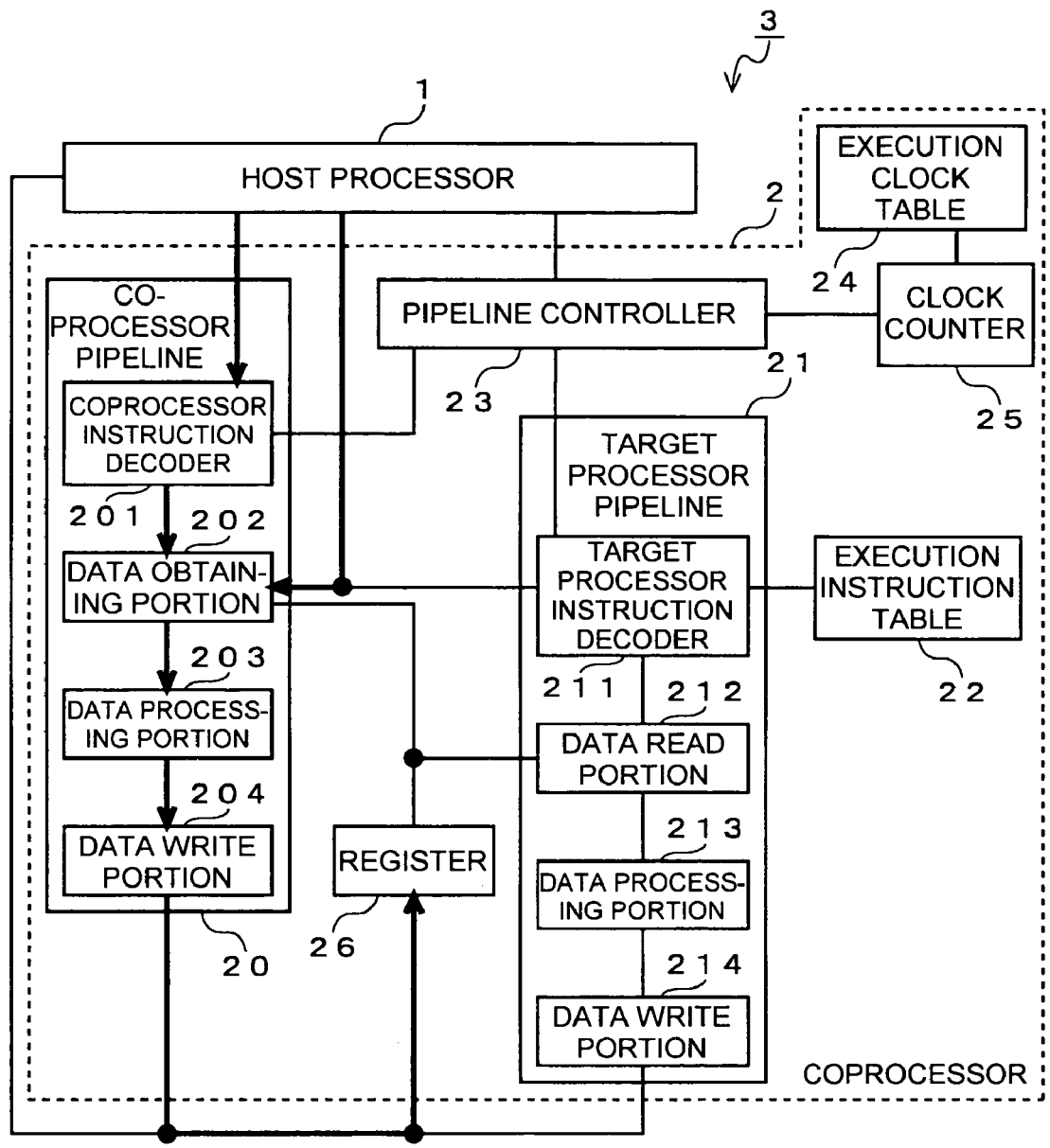
FIG. 8 is an illustration for explaining a flow of data when a coprocessor instruction does not direct execution of emulation.

When the coprocessor instruction does not direct execution of emulation, the coprocessor instruction directs execution of processings excluding the emulation, which may be executed by the coprocessor 2. In this case, corresponding processing is executed by the coprocessor pipeline 20 (step S50:N, step S60). A flow of the data in the coprocessor 2 when the coprocessor instruction does not direct execution of emulation becomes, for example, the flow in FIG. 8.

When confirming that the coprocessor instruction does not direct execution of emulation by the coprocessor instruction decoder 201, the coprocessor instruction decoder 201 notifies the data obtaining portion 202 that the coprocessor instruction does not direct execution of emulation. Moreover, the coprocessor instruction decoder 201 sends the processing content obtained by decoding the coprocessor instruction to the data obtaining portion 202. The data obtaining portion 202 obtains the data necessary for processing from the host processor 1 and/or register 26 in accordance with the processing content sent from the coprocessor instruction decoder 201. The obtained data is sent to the data processing portion 203 together with the processing content. The data processing portion 203 processes the sent data in accordance with the processing content and sends the data obtained as a result of the processing to the data write portion 204. The data write portion 204 writes the data obtained as a result of the processing in the register 26 in accordance with the direction of the processing content. The data write portion 204 may return the processing result to the host processor 1 depending on the processing content.

When the coprocessor instruction directed execution of emulation (step S50:Y), the coprocessor instruction decoder 201 notifies the pipeline controller 23 that execution of emulation is directed. When execution of emulation is notified, the pipeline controller 23 directs the target processor instruction decoder 211 of the target processor pipeline 21 to execute emulation.

When execution of emulation is directed, the target processor instruction decoder 211 receives the coprocessor data supplied from the host processor 1 as a target processor instruction. The target processor instruction decoder 211 determines whether the received target processor instruction directs the processing which may be executed in accordance with the emulation of the target processor pipeline 21 (step S70). The target processor instruction decoder 211 decodes the target processor instruction having the format shown in FIG. 4 to obtain a decoding result value. The target processor instruction decoder 211 is possible to confirm whether the processing content by the target processor instruction may be executed by the coprocessor 2 comparing the decoding result value with the execution instruction table 22.

When the target processor instruction does not direct the processing which may be executed in accordance with the emulation of the target processor pipeline 21 (step S70:N), the target processor instruction decoder 211 notifies the host processor 1 that the target processor instruction does not direct the processing through the pipeline controller 23 (step S80). The host processor 1 executes the processing through emulation in accordance with a notice from the coprocessor 2 (step S90).

Figure 9:
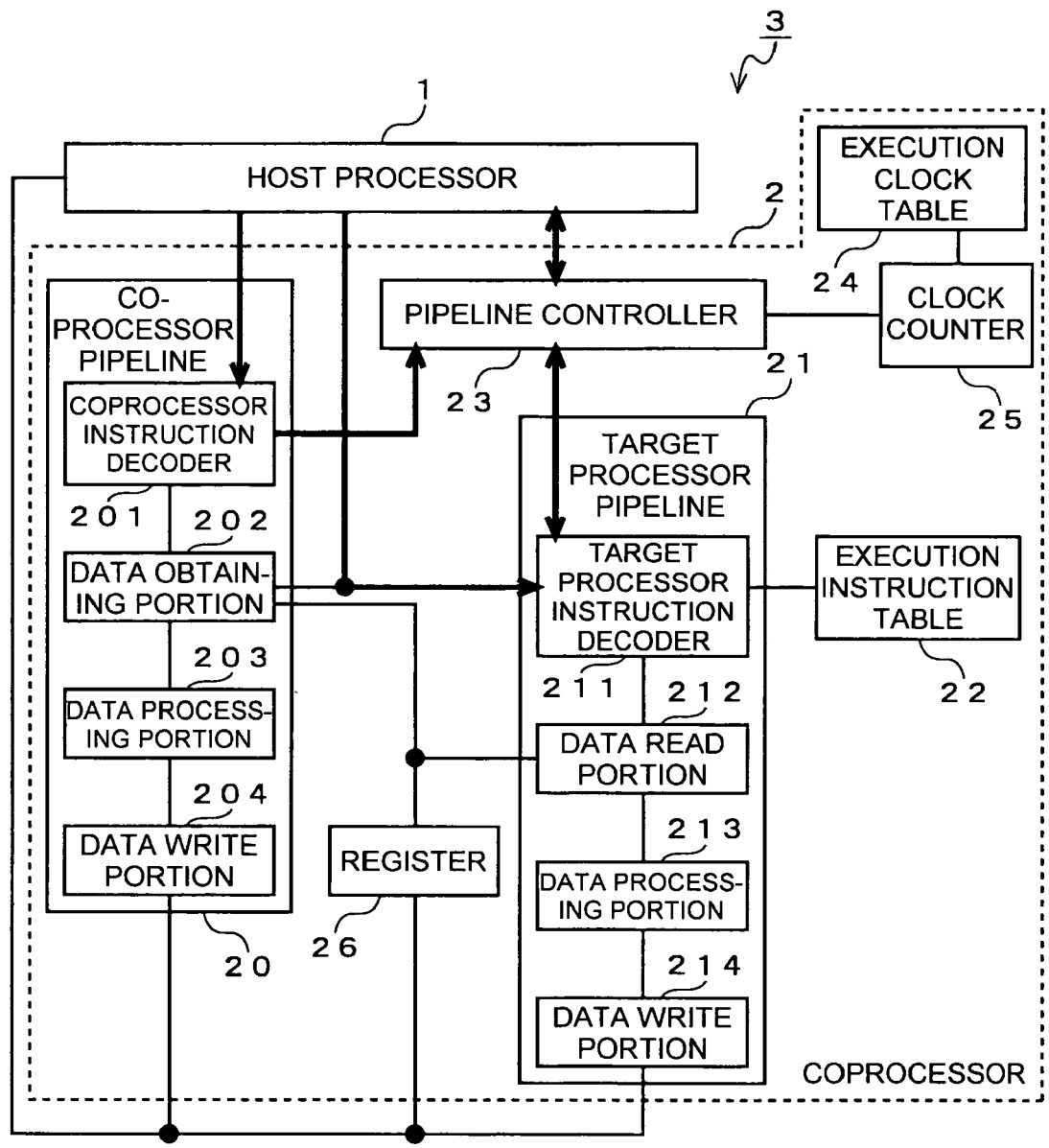
FIG. 9 is an illustration for explaining a flow of data when execution of emulation which may not be executed by a coprocessor is directed.

FIG. 9 is an illustration showing a flow of data in this case. The notice to the host processor 1 includes a content corresponding to "value" in FIG. 5. That is, the content is a content including whether to leave all processings or some of the processing to the host processor 1. When sending the notice to the host processor 1, the coprocessor 2 may send the information on the decoded target processor instruction to the host processor 1. Moreover, the coprocessor 2 may send a decoding result directly or the target processor instruction is divided and sent so that the load of decoding by the host processor 1 is decreased. Thereby, it is not necessary to decode the target processor instruction by the host processor 1 again.

Figure 10:
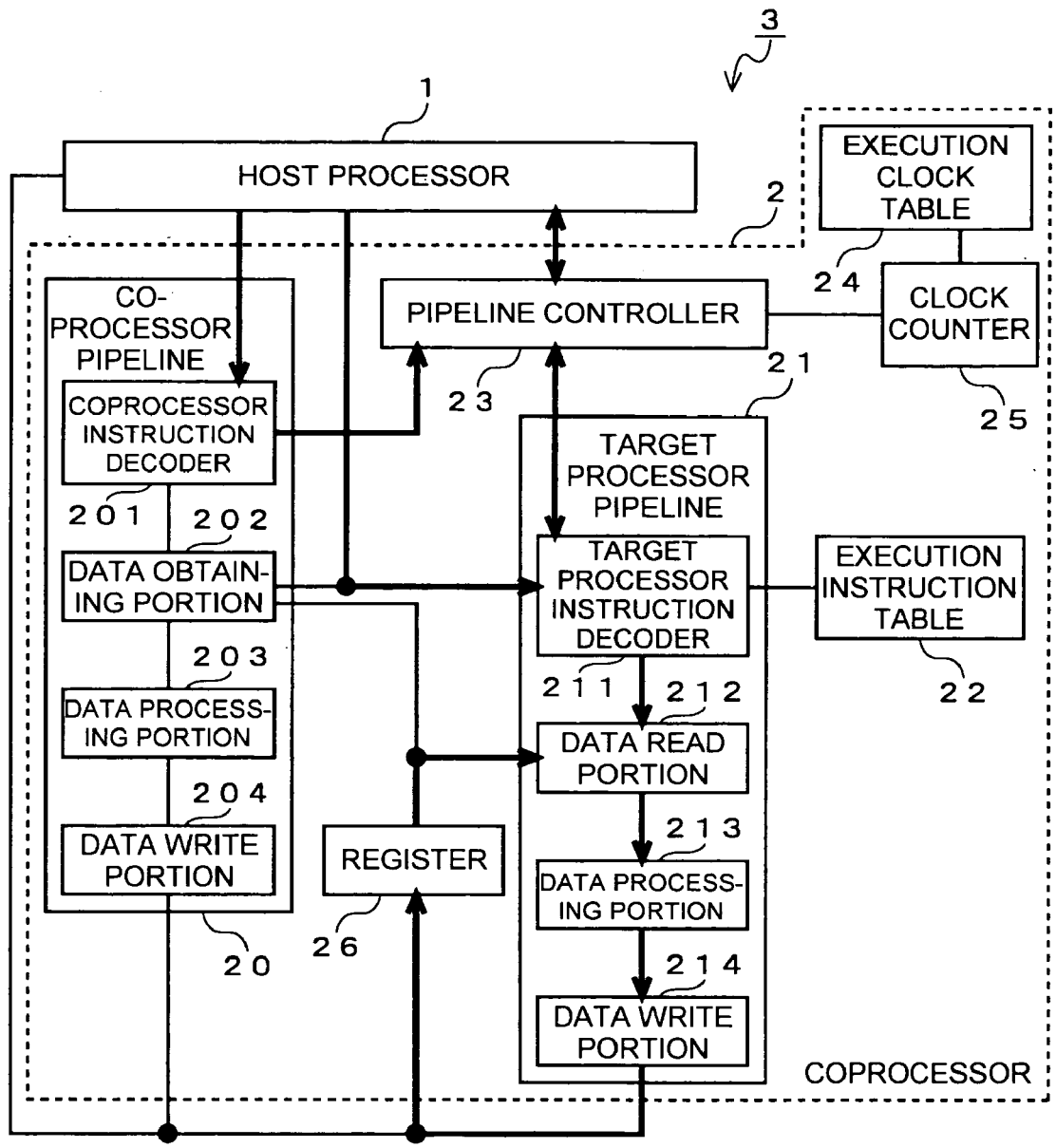
FIG. 10 is an illustration for explaining a flow of data when emulation is executed by a coprocessor.

When the target processor instruction represents the processing, which may be executed in accordance with the emulation of the target processor pipeline 21, the target processor pipeline 21 executes the processing directed by the target processor instruction (step S70: Y, step S100). FIG. 10 is an illustration showing a flow of data in this case.

When confirming that the target processor instruction may be executed by the coprocessor 2, target processor instruction decoder 211 sends the processing content obtained by decoding the target processor instruction to the data read portion 212. The data read portion 212 obtains the data necessary for processing from the register 26 in accordance with the processing content sent from the target processor instruction decoder 201. The obtained data is sent to the data processing portion 213 together with the processing content. The data processing portion 213 processes the sent data in accordance with the processing content and sends the data obtained as a result of the processing to the data write portion 214. The data write portion 214 writes a processing result in the register 26 in accordance with the direction of the processing content. The data write portion 214 may return the processing result to the host processor 1 depending on the processing content.

When executing the target processor instruction by the coprocessor 2, a decoding result value is communicated to the clock counter 25 from the target processor instruction decoder 211. The clock counter 25 confirms the type of processing by the target processor instruction and its necessary time by referring to the execution clock table 24 with the decoding result value. The clock counter 25 subtracts the necessary time confirmed by the execution clock table 24 from the necessary time set by timing data. When a subtraction result becomes "0" or negative, the clock counter 25 notifies the host processor 1 that the subtraction result becomes "0" or negative through the pipeline controller 23 or directly.

The host processor 1 may detect actual emulation time by the coprocessor 2 by measuring the time from output of the timing data up to the notice from the clock counter 25.

Emulation is performed in accordance with the above processing procedure.

The host processor 1 may send coprocessor instructions one by one to the coprocessor 2 whenever a coprocessor instruction is completed. For example, the host processor 1 sends the next coprocessor instruction to the coprocessor 2 by waiting for completion of a coprocessor instruction to be communicated from the pipeline controller 23.

Moreover, when emulation is performed by the target processor pipeline 21, the host processor 1 may send the next coprocessor instruction to the coprocessor 2. Because the coprocessor 2 may decode a coprocessor instruction separately from emulation, the coprocessor 2 can perform processing without difficulty even if a coprocessor instruction is sent at this timing.

In the case of the present invention, the host processor 1 and coprocessor 2 perform emulation together. Therefore, even if the host processor 1 has only a performance used for the compile method emulation, the processor 3 is possible to perform the interpreter method emulation. For example, by changing the content of the execution instruction table 22 and increasing the number of instructions for the emulation, which may be executed by the coprocessor 2, it is possible to decrease the load of the host processor 1 by the emulation.

What is claimed is:

1. An information processing device comprising
a first processor for obtaining a predetermined instruction; and
a second processor for executing processing by emulation in accordance with a direction from the first processor,
wherein the first processor is constituted so as to direct the second processor to execute the processing by emulation in accordance with the predetermined instruction and to send the second processor data used for the processing by emulation,
wherein the second processor includes:
a determination means for determining whether the processing by emulation is executable based on the data sent from the first processor upon receiving the direction to execute the processing by emulation by the second processor, and when the processing by emulation is not executable by the second processor, sending a notice that the processing by emulation is not executable by the second processor to the first processor together with information generated from the data, and
a second processing means for executing the processing by emulation when the processing by emulation is executable by the second processor,
wherein the first processor is constituted so as to execute the processing by emulation when the notice is sent from the second processor, and
wherein the first processor and the second processor are constituted so as to execute the processing by emulation together.

2. The information processing device according to claim 1, wherein the first processor includes:
a first processing means configured to execute the processing according to the predetermined instruction;
a control means for determining whether the predetermined instruction is an instruction which should be processed by the second processor and when the predetermined instruction is not an instruction which should be executed by the second processor, making the first processing means execute the processing according to the instruction, and when the predetermined instruction is an instruction which should be executed by the second processor, directing the second processor to execute the predetermined processing; and
the control means is constituted so as to make the first processing means execute the predetermined processing when the notice is sent from the second processor.

3. The information processing device according to claim 1, wherein:
the second processor retains a table representing the processing executable by the second processor, and
the determination means is constituted so as to determine whether the predetermined processing directed from the first processor is executable by the second processor by referring to the table.

4. The information processing device according to claim 1, wherein:
the predetermined processing directed from the first processor comprises emulation, and the first processor or the second processor is constituted so as to execute the predetermined processing.

5. The information processing device according to claim 2, wherein:
the first processor is constituted so as to obtain data used for the processing according to the predetermined instruction;
the predetermined instruction directs either of execution of processing by the first processor and execution of processing by the second processor including execution of emulation;
the data is used for the processing when the predetermined instruction is an instruction for directing the processing by the first processor or execution of the processing excluding emulation by the second processor, and the data directs the processing to be executed by the emulation when the predetermined instruction is au instruction for execution of the emulation;
the control means of the first processor is constituted so as to make the first processing means execute the processing according to the instruction by using the data when the predetermined instruction is an instruction for directing execution of the processing by the first processor, and the control means is constituted so as to send the predetermined instruction and the data to the second processor when the predetermined instruction is an instruction for directing execution of the processing by the second processor;
the second processor further includes third processing means for executing the processing according to the instruction by using the data when the predetermined instruction sent from the control means directs execution of the processing excluding emulation by the second processor;
the determination means is constituted so as to determine whether the processing directed by the data is executable in accordance with the emulation by the second processor when the predetermined instruction sent from the control means directs execution of emulation;
the second processing means is constituted so as to execute the processing in accordance with the emulation when the processing directed by the data is executable in accordance with the emulation by the second processor;
the control means of the first processor is constituted so as to make the first processing means execute the processing directed by the data in accordance with the emulation when the notice is sent from the determination means of the second processor; and
the first processor and the second processor execute the emulation together.

6. The information processing device according to claim 3, wherein the first processor is constituted so as to set a set value representing the number of processings to be executed in accordance with emulation by necessary time to the second processor at intervals of predetermined time,
wherein the second processor further includes:
an execution clock table representing necessary time required when a target processor executes the processing to be executed in accordance with emulation by the second processing means, and
a clock counter for reading the necessary lime of the processing executed in accordance with the emulation by the second processing means from the execution clock table, successively
subtracting the necessary time from the set value set by the first processor, and when a subtraction result becomes 0 or less, sending a notice that the subtraction result becomes 0 or less to the first processor, and
wherein the first processor is constituted so as to measure a duration from when the first processor receives a notice from the clock counter to after setting the set value to the second processor and to measure a processing time of emulation by the second processor.

7. The information processing device according to claim 1, wherein:
the second processor is a coprocessor of the first processor, and
the first processor and the second processor are coprocessor-connected.

8. An information processing method to be executed by an information processing device including a first processor for obtaining a predetermined instruction and a second processor for executing processing by emulation in accordance with a direction from the first processor, wherein the first processor and the second processor execute the processing according to the instruction together, and wherein the method comprises:
a step for the first processor to direct the second processor to execute the predetermined processing in accordance with the predetermined instruction and to send the second processor data used for the processing by emulation;
a step for the second processor to determine whether the predetermined processing directed from the first processor is executable by the second processor;
a step for the second processor to execute the processing by emulation when the processing by emulation is executable by the second processor based on the data sent from the first processor, upon receiving the direction to execute the processing by emulation;
a step for the second processor to notify the first processor that the processing by emulation is not executable by the second processor when the processing by emulation is not executable by the second processor together with information generated from the data; and
a step for the first processor to execute the processing by emulation when receiving the notice that the processing by emulation is not executable by the second processor is received from the second processor.

9. A semiconductor device comprising:
a first processor for obtaining a predetermined instruction; and
a second processor for executing processing by emulation in accordance with a direction from the first processor,
wherein the first processor is constituted so as to direct the second processor to execute the processing by emulation in accordance with the predetermined instruction,
wherein the second processor includes:
a determination means for determining whether the processing by emulation directed from the first processor is executable based on the data sent from the first processor upon receiving the direction to execute the processing by emulation by the second processor, and when the processing by emulation is not executable by the second processor, sending a notice that the processing by emulation is not executable by the second processor to the first processor together with information generated from the data, and a second processing means for executing the processing by emulation when the processing by emulation is executable by the second processor, wherein the first processor is constituted so as to execute the processing by emulation when the notice is sent from the second processor, and wherein the first processor and the second processor are constituted so as to execute the processing according to the predetermined instruction together.

10. A computer-readable medium on which is stored a computer program for directing a computer system to perform processing, the computer system including a first processor for obtaining a predetermined instruction and a second processor for executing processing by emulation in accordance with a direction from the first processor, wherein the first processor and the second processor execute the processing according to the instruction together, the processing comprising:

the processing for the first processor to direct the second processor to execute the processing by emulation in accordance with the predetermined instruction;

the processing for the second processor to determine whether the processing by emulation directed from the first processor is executable by the second processor based on the data sent from the first processor, upon receiving the direction to execute the processing by emulation;

the processing for the second processor to execute the processing by emulation when the processing by emulation is executable by the second processor;

the processing for the second processor to notify the first processor that the processing by emulation is not executable by the second processor when the processing by emulation is not executable by the second processor together with information generated from the data; and the processing for the first processor to execute the processing by emulation when receiving the notice that the processing by emulation is not executable by the second processor from the second processor.

11. An information processing device comprising:

a first processor for obtaining a predetermined instruction; and a second processor for executing processing by emulation in accordance with a direction from the first processor, wherein the first processor includes:

communication means for directing the second processor to execute the processing by emulation in accordance with the predetermined instruction, and sending data used for the processing by emulation to the second processor, and a first processing means being operable to execute the processing, wherein the second processor includes:

a first determination means for determining whether the processing by emulation directs execution of a specific processing, wherein the processing by emulation includes an emulation to be executed by the second processor and the specific processing comprises the emulation, a second determination means for determining, when the processing by emulation directs execution of the specific processing, whether the second processor is able to execute the specific processing, based on information decoded from the data, and, when the second processor is not able to execute the specific processing, sending the decoded information together with a notice that the second processor is not able to execute the specific processing to the first processor, a second processing means for executing, when the second processor is able to execute the specific processing, the specific processing in accordance with the decoded information, and a third processing means for executing, when the processing by emulation does not direct the specific processing, the processing by emulation by using the data, wherein the first processing means of the first processor is constituted so as to execute, when the notice is received from the second processor, the specific processing in accordance with the decoded information received from the second processor along with the notice, and wherein the first processor and the second processor are constituted so as to execute the processing according to the predetermined instruction together.

12. The information processing device according to claim 11, wherein at least one of the first processing means and the second processing means is adapted for executing the specific processing in accordance with the emulation.

13. The information processing device according to claim 12, wherein the first processor is adapted for setting a set value representing the number of processing to be executed in accordance with emulation by necessary time to the second processor at intervals of predetermined time, wherein the second processor further includes:

an execution clock table representing necessary time required when a target processor executes the processing to be executed in accordance with emulation by the second processing means, and a clock counter for reading the necessary time of the processing executed in accordance with the emulation from the execution clock table, successively subtracting the necessary time from the set value, and when a subtraction result becomes 0 or less, sending a notice that the subtraction result becomes 0 or less to the first processor, and wherein the first processor is adapted to measure a duration from when the first processor receives a notice from the clock counter to after setting the set value to the second processor and to measure a processing time of emulation by the second processor.

14. An information processing method to be executed by an information processing device including a first processor for obtaining a predetermined instruction and a second processor for executing processing by emulation in accordance with a direction from the first processor, the first processor and the second processor executing the processing according to the instruction together, the method comprising:

the first processor sending the second processor data used for the processing by emulation and directing the second processor to execute the processing by emulation in accordance with the predetermined instruction;

the second processor determining whether the processing by emulation directed from the first processor directs to execute the specific processing;

the second processor executing, when the processing by emulation does not direct the specific processing, the processing by emulation by using the data;

the second processor determining, when the processing by emulation directs execution of the specific processing, whether the second processor is able to execute the specific processing based on information decoded from the data;

the second processor executing, when the second processor is able to execute the specific processing, the specific processing in accordance with the decoded information;

the second processor sending, when the second processor is not able to execute the specific processing, the decoded information and a notice that the second processor is not able to execute the specific processing to the first processor; and the first processor executing, when the notice is received from the second processor, the specific processing in accordance with the decoded information received from the second processor along with the notice.

15. A semiconductor device comprising:

a first processor for obtaining a predetermined instruction; and a second processor for executing processing by emulation in accordance with a direction from the first processor, wherein the first processor includes:
  communication means for directing the second processor to execute the processing by emulation in accordance with the instruction, and for sending data used for the processing by emulation to the second processor, and
  a first processing means being operable to execute the processing by emulation, wherein the second processor includes:
a first determination means for determining whether the processing by emulation directs execution of a specific processing,
a second determination means for determining, when the processing by emulation directs execution of the specific processing, whether the second processor is able to execute the specific processing, based on information decoded from the data, and, when the second processor is not able to execute the specific processing, sending the decoded information and a notice that the second processor is not able to execute the specific processing to the first processor,
a second processing means for executing, when the second processor is able to execute the specific processing, the specific processing in accordance with the decoded information, and
a third processing means for executing, when the processing by emulation does not direct the specific processing, the processing by emulation by using the data,
wherein the first processing means of the first processor is constituted so as to execute, when the notice is received from the second processor, the specific processing in accordance with the decoded information received from the second processor along with the notice, and
wherein the first processor and the second processor execute the processing according to the predetermined instruction together.

16. A computer readable recording medium causing a computer comprising a first processor for obtaining a predetermined instruction and a second processor for executing processing by emulation in accordance with a direction from the first processor, to execute a method comprising:

the first processor directing the second processor to execute the processing by emulation in accordance with the predetermined instruction;

the second processor determining whether the processing by emulation directed from the first processor directs to execute the specific processing;

the second processor executing, when the processing by emulation does not direct the specific processing, the processing by emulation by using the data;

the second processor determining, when the processing by emulation directs execution of the specific processing, whether the second processor is able to execute the specific processing based on information decoded from the data;

the second processor executing, when the second processor is able to execute the specific processing, the specific processing in accordance with the decoded information;

the second processor sending, when the second processor is not able to execute the specific processing, the decoded information and a notice that the second processor is not able to execute the specific processing to the first processor; and the first processor executing, when the notice is received from the second processor, the specific processing in accordance with the decoded information received from the second processor along with the notice.

17. An information processing device comprising a first processor for obtaining a predetermined instruction and data used for a processing according to the predetermined instruction; and a second processor for executing processing by emulation in accordance with a direction from the first processor, the predetermined instruction directs either of execution of processing by the first processor or execution of processing by the second processor including execution of emulation;

the data is used for the processing when the predetermined instruction is an instruction for directing the execution of the processing by the first processor or execution of the processing excluding emulation by the second processor, and the data directs the processing to be executed by the emulation when the predetermined instruction is an instruction for directing execution of the emulation wherein the processing by the predetermined instruction and the data is executed by the first processor and the second processor together;

wherein the first processor is constituted so as to direct the second processor to execute the processing by emulation in accordance with the predetermined instruction and to send the data used for the processing by emulation;

wherein the second processor includes
  a determination means for determining whether the processing by emulation is executable based on the data sent from the first processor upon receiving the direction to execute the processing by emulation by the second processor, and when at least a part of the processing by emulation is not executable by the second processor, sending a notice that the processing by emulation is not executable by the second processor to the first processor together with information generated from the data, and
  a second processing means for executing the processing in accordance with the emulation when the processing directed by the data is executable in accordance with the emulation by the second processor, wherein the first processor is further constituted so as to execute the processing directed by the data in accordance with the emulation when the notice is sent from the determination means of the second processor.

18. The information processing device according to claim 17,
wherein the second processor retains table for representing whether the processing is all executable, partly executable, or not executable at all by the second processor for each processing in accordance with the emulation directed by the data, wherein the determination means determined whether at least a part of processing, in accordance with the emulation directed by the data is executable or not executable by the second processor by referring to the table, and when the at least a part of processing is not executable, sending the notice that includes information indicating that the processing is partly executable or not executable at all by the second processor to the first processor.

* * * * *